United States Patent [19]

Hui et al.

[11] Patent Number: 5,847,528
[45] Date of Patent: Dec. 8, 1998

[54] MECHANISM FOR CONTROL OF POSITION AND ORIENTATION IN THREE DIMENSIONS

[75] Inventors: Raymond Chung-Ying Hui; Vincent Hayward, both of Montreal; Alain Gerard Ouellet, Moncton; Walter Peruzzini; Pedro Gregorio, both of Montreal; Andrew Wang, Markham; George Vukovich, St-Bruno, all of Canada

[73] Assignee: Canadian Space Agency, Saint-Hubert, Canada

[21] Appl. No.: 446,060

[22] Filed: May 19, 1995

[51] Int. Cl.⁶ .................. B25J 1/02; B66C 1/00
[52] U.S. Cl. .................. 318/568.1; 318/568.11; 414/735; 74/479 B; 901/17
[58] Field of Search .................. 318/560–696; 901/21–25, 43, 17; 414/735, 730, 729, 731; 74/479.01, 469; 395/800–890

[56] References Cited

U.S. PATENT DOCUMENTS

| | | | |
|---|---|---|---|
| 3,631,737 | 1/1972 | Wells | 74/469 |
| 3,783,706 | 1/1974 | Ogawa et al. | 74/469 |
| 4,651,589 | 3/1987 | Lambert | 74/469 |
| 4,666,362 | 5/1987 | Landsberger et al. | 414/735 |
| 4,762,016 | 8/1988 | Stoughton et al. | 74/479 |
| 4,806,068 | 2/1989 | Kohli et al. | 414/735 |
| 4,811,608 | 3/1989 | Hilton | 73/862.04 |
| 4,819,496 | 4/1989 | Shelef | 74/479 |
| 4,865,376 | 9/1989 | Leaver et al. | 901/21 |
| 4,919,382 | 4/1990 | Forman | 74/479 |
| 4,976,582 | 12/1990 | Clavel | 414/729 |
| 5,129,279 | 7/1992 | Rennex | 74/479 |
| 5,219,266 | 6/1993 | Reboulet et al. | 414/733 |
| 5,223,776 | 6/1993 | Radke et al. | 318/568.1 |
| 5,271,290 | 12/1993 | Fischer | 74/471 |
| 5,301,566 | 4/1994 | Tahmasebi et al. | 74/479 B |
| 5,313,854 | 5/1994 | Akeel | 74/479 BF |
| 5,333,514 | 8/1994 | Toyama et al. | 74/479 BW |
| 5,388,935 | 2/1995 | Sheldon | 409/201 |

FOREIGN PATENT DOCUMENTS

| | | |
|---|---|---|
| 112099 | 6/1984 | European Pat. Off. . |
| 494565 | 7/1992 | European Pat. Off. . |
| 932017 | 5/1982 | U.S.S.R. . |
| 1049244 | 10/1983 | U.S.S.R. . |
| 1481053 | 5/1989 | U.S.S.R. . |
| 1668784 | 8/1991 | U.S.S.R. . |
| 1668785 | 8/1991 | U.S.S.R. . |
| 1668786 | 8/1991 | U.S.S.R. . |

OTHER PUBLICATIONS

Towards a Fully–Parallel 6 DOF Robot for High–Speed Applications by F. Pierrot, A. Fournier and P. Dauchez (Six page technical journal article, France).

A New Design of a 6–DOF Parallel Robot by F. Pierrot, M. Uchiyama, P. Dauchez and A. Fournier (Eight page article from *Journal of Robotics and Mechatronics*, vol. 2, No. 4, Aug. 1990, France).

*Primary Examiner*—Paul Ip
*Attorney, Agent, or Firm*—Lynn C. Schumacher; Hill & Schumacher; Ralph A. Dowell

[57] ABSTRACT

The subject invention provides a parallel or closed loop mechanism for moving and positioning a member in space. The mechanism includes three branches each provided with at least two link members being serially connected together by a spherical elbow joint whereby the first and second link members are rotatable with respect to each other about any axis passing through a center of the first joint. The mechanism is provided with actuators for moving each branch and the first links of each branch are rigidly connected at an end portion thereof to the actuator means. The mechanism includes three revolute joints each defining a longitudinal axis of rotation. Each revolute joint is connected to an associated second link member so that the longitudinal axes of all third joints intersect at a point and the revolute joints are interconnected so that the three branches form three parallel or closed loops.

23 Claims, 8 Drawing Sheets

etc.

MECHANISM FOR CONTROL OF POSITION AND ORIENTATION IN THREE DIMENSIONS

FIELD OF THE INVENTION

The present invention relates to mechanisms for controlling position and orientation in three dimensions of an end piece, and has application to robotics, hand controllers, manipulanda, haptic devices and force-reflecting mechanisms.

BACKGROUND OF THE INVENTION

This invention relates to parallel mechanisms for controlling position and orientation of an end-piece in three dimensions. There are numerous applications which require control of orientation and position of an end piece. Particularly, fields such as virtual reality, telerobotics, computer control of vehicles or other machines and data visualization to mention a few are emerging as significant technologies of which an important feature is the human-machine interface. One of the key components of the human-machine interface is the input controller or input device which permits a user to manipulate three-dimensional objects, virtual or real, under computer control.

There are essentially two basic approaches to the design of control mechanisms, the first is the serial configuration and the second is the parallel configuration. Serial mechanisms or linkages comprise a number of generally rigid mechanical links connected end-to-end in series by either prismatic joints or by revolute joints to form an open loop, multi-jointed arm. Serial mechanisms are advantageous when a large range of motion is required in which the forward kinematic model is used to describe the motion. Disadvantages of the serial mechanism include low output force-to-mass and stiffness-to-mass ratios due to the need to provide power directly to each joint by either mounting actuators directly to the joint or by transmitting the power to each joint from base-mounted actuators. Where each joint has an actuator attached directly thereto, the serially connected links must be able to support the mass of all the actuators in addition to the links. The inertia sustained by any one actuator includes the inertia of the end-piece (load) and those links and other actuators supported by the actuator. Therefore, depending on the task being performed and the weight requirements of the links and actuators, serial configurations are not always practicable.

The parallel configuration comprises two or more linkage branches connected in parallel to an end-piece or end effector so that one or more closed loops are formed. The parallel or closed loop configuration is advantageous because it provides generally higher force-to-mass and stiffness-to-mass ratios and is capable of higher speed and positioning accuracy of the end piece over serial linkages. Increased stiffness is achieved because there are opportunities to arrange the mechanisms such that the links are exposed to simple stress components. Disadvantages of the parallel configuration include limited range of motion and interference of the component links due to the closed loop configuration; design complexity due to the large number of joints required, especially passive joints; and complexity of the kinematic model used to describe the motion of the end-piece due to direct measurement of the positions of the directly controlled joints and not the passive joints. Closed form forward kinematic solutions (comprising finding the end-piece position and orientation given the positions of the controlled or measured joints) exist only for special parallel mechanisms which nevertheless are more complex than the solutions for serial mechanisms.

Hand-held input devices are routinely used for control of aircraft, robotic manipulators and remote control of mechanical systems in general. In certain applications the input device may be a passive device, i.e. the input position is measured and there is no force reflection. In other applications force reflection i.e. the ability of the mechanism to resist the operator's motion, is desirable or required. In both passive and force-reflecting applications the aforementioned advantages of parallel control mechanisms are desired.

U.S. Pat. No. 5,279,176 discloses a six degree of freedom (DOF) control mechanism for the position and orientation of a platform comprising three rigid, inextensible legs attached to the platform by universal joints. The other end of the legs are attached to a two DOF driver such as a five-bar linkage by universal joints and the drivers move the legs parallel to the base to adjust the position of the platform. The device is designed to provide only small platform displacements with high resolution and stiffness which is achieved in part with the rigid, inextensible legs.

U.S. Pat. No. 4,976,582 discloses a control device for providing position control of a platform maintained at a fixed inclination and orientation. Three control arms are connected to actuators mounted on a base and are constrained to rotate about an axis perpendicular to the longitudinal axis of the arm. The other end of the control arms are each connected to a pair of spaced, parallel linking bars via Cardon type articulations or ball and socket joints. The other ends of the parallel linking bars are coupled to the movable platform. The platform is constrained to move in a fixed orientation so that it remains parallel to itself as it moves in three dimensions. An end-piece or end-effector is mounted on the movable platform.

U.S. Pat. No. 4,806,068 discloses a rotary linear actuator for robotic applications comprising a rotary linear actuator mounted on a base. A first link is pivotally attached at one end to the base and is driven by a rotary actuator and the other end is coupled to a second link using a revolute joint. There are three such serial links each connected to a support platform by spherical ball joints to form a closed loop parallel configuration. Each arm can be slid with respect to the base by means of a hydraulic piston.

U.S. Pat. No. 4,651,589 discloses a polyarticulated retractile mechanism for controlling position and orientation of a support platform comprising two platforms connected by three pairs of triangular structures with each pair of triangular structures joined at the respective apex of each via a spherical ball joint.

As discussed above, a significant drawback to many known parallel mechanisms for controlling position and orientation is the complexity of the forward kinematic model needed for determining the end point position from the position of the controlled joints. Accordingly, it would be advantageous to provide a parallel mechanism for controlling position and orientation which is representable by a simpler forward kinematic model than required for previous parallel mechanisms.

SUMMARY OF THE INVENTION

The subject invention provides a mechanism for moving and positioning a member in space. The mechanism comprises at least three branches each provided with at least first and second link members being serially connected together by a first spherical joint. The mechanism is provided with at least three second joints each defining an axis of rotation.

Each second joint is connected to associated second link member so that the axes of rotation of the second joints intersect at a point and the second joints are interconnected so that the at least three branches define at least three closed loops.

BRIEF DESCRIPTION OF THE DRAWINGS

The following is a description, by way of example only, of different embodiments of the mechanism for control of position and orientation in three dimensions forming the present invention, reference being had to the accompanying drawings, in which.

DETAILED DESCRIPTION OF THE INVENTION

Figure 1:
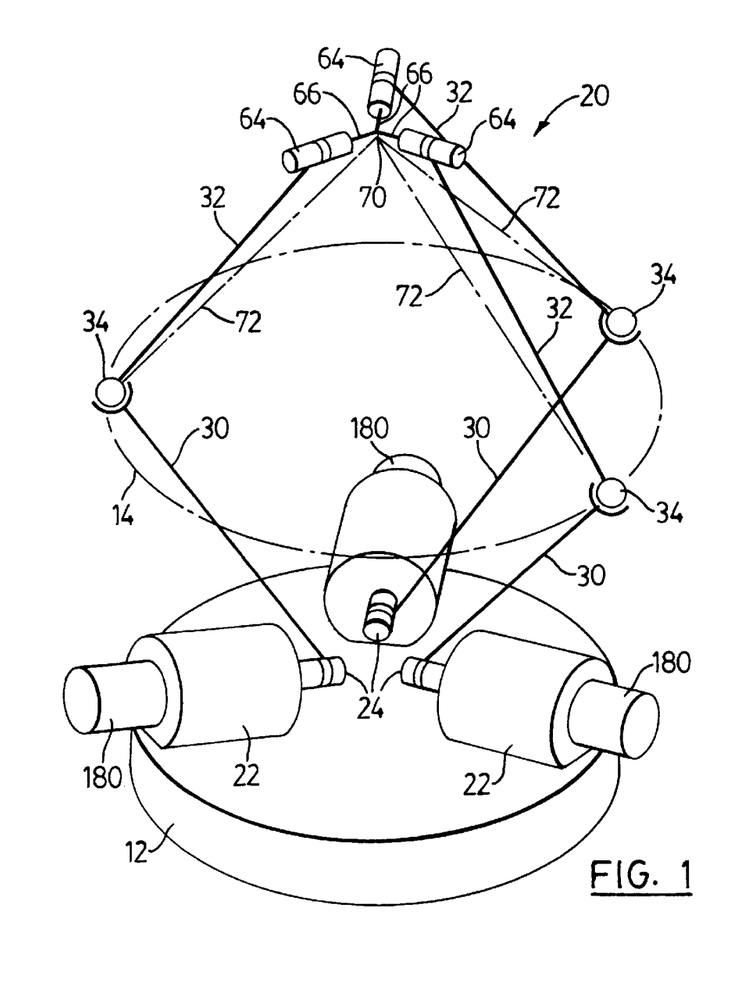
FIG. 1 is a diagrammatic representation of a mechanism for controlling position and orientation in three dimensions constructed in accordance with the present invention.

Referring first to FIG. 1, a mechanism for positioning and orienting an object is shown generally at 20. Mechanism 20 is provided with three sensors 180 and three actuators 22 comprising revolute motors with shafts 24 mounted on a base 12. Actuator may mean simply a stand alone motor or a motor in combination with a transmission stage comprising various gears, harmonic drives, cable and pulley systems and the like. Primary links 30 are rigidly attached at one end thereof to associated shafts 24 so that as shafts 24 rotate the primary links pivot about the shafts. The sensors 180 may be any sensor means capable of measuring the angular position of link 30 including potentiometers and optical encoders to mention just a few.

Secondary links 32 are connected at one end to the other ends of primary links 30 by joints 34. Joint 34 may be any joint which permits links 30 and 32 to rotate with respect to each other about any axis passing through the centres of the joints such as spherical elbow joints or ball and socket joints as shown in FIG. 1.

Figure 2:
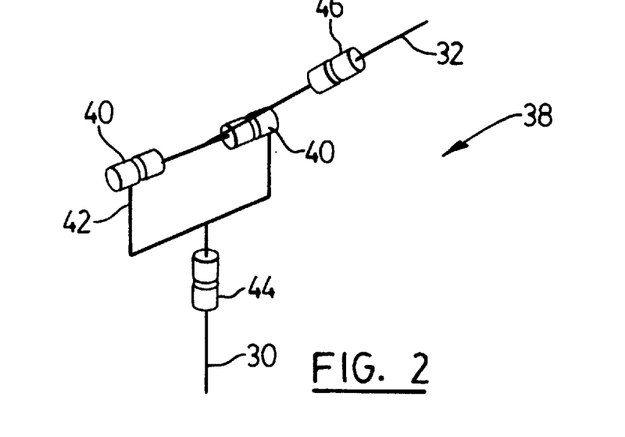
FIG. 2 is an alternative embodiment of an elbow joint which may be used in the mechanisms embodying the present invention.
Figure 3:
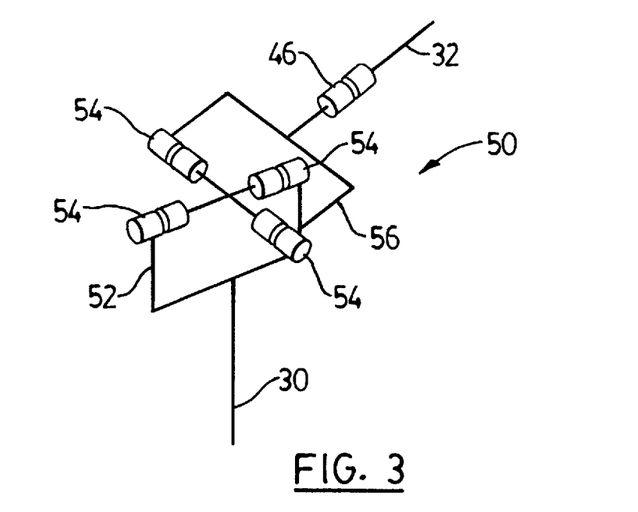
FIG. 3 is another alternative elbow joint which may be used in the mechanisms of the present invention.

Examples of alternative joints are shown at 38 in FIG. 2 and 50 in FIG. 3. Joint 38 includes two collinear revolute joints 40 connected to links to form a loop 42 which is connected to revolute joint 44 connected in series with primary link 30 so that loop 42 can rotate with respect to link 30. A revolute joint 46 is connected in series to secondary link 32 which is connected to loop 42. The result is three generally non-parallel axes of rotation intersecting at a single point to allow links 30 and 32 to rotate with respect to each other about any axis passing through the point of intersection. Joint 50 shown in FIG. 3 gives essentially the same freedom of movement of link 32 with respect to link 30 using a loop 52 having two revolute joints 54 connected to primary link 30. Loop 52 is also connected to a loop 56 also comprised of two revolute joints 54. Secondary link 32 is connected to revolute joint 46 which in turn is connected to loop 56. Joints 34, 38 and 50 are all essentially spherical joints or spherical elbow joints having a centre whereby link members 30 and 32 are rotatable with respect to each other about any axis passing through the centre of the spherical joint. Depending on the application, links 30 and 32 may be of the same or different lengths.

Referring again to FIG. 1, the end portions of links 32 spaced from joints 34 are attached to revolute joints 64. Revolute joints 64 comprise two portions which rotate with respect to each other about a common longitudinal axis. Each revolute joint 64 has a link 66 extending along the longitudinal axis of the joint which intersect and is rigidly attached at the intersection point 70. Actuators 22 and primary links 30 form the primary stage of positioning mechanism 20 and the spherical joints 34, secondary links 32 and the end-effector comprising revolute joints 64 and links 66 form the secondary stage. The distance between intersection point 70 and the centres of spherical joints 34, indicated by broken lines 72, is fixed and may be considered the length of a virtual or effective secondary link replacing link 32. The position of the end-effector 70 in any position is found by finding the point of intersection of three spheres each centred at one of spherical joints 34, with the radius of each sphere being the associated virtual link 72.

Actuators 22 are arranged in the Y-shaped configuration in mechanism 20 and the primary and secondary stages may be designed to be congruent wherein the primary links and secondary links attached thereto are of the same length and the end-effector links 66 are arranged identically to the actuators shafts 24 and the primary links 30 are connected to the actuators 22 in the same way as the secondary links 32 are connected to the end-effector. Designing the primary stage to be a mirror image of the secondary stage through the plane 14 containing the spherical joints 34 is very advantageous because it further simplifies the steps required to determine the orientation of the end-effector. Specifically, the forward kinematic model can be formulated by reflecting the actuator through the mirror plane 14 and results in a kinematic model much simplified over for example the models required to describe many known positioning mechanisms.

Figure 4:
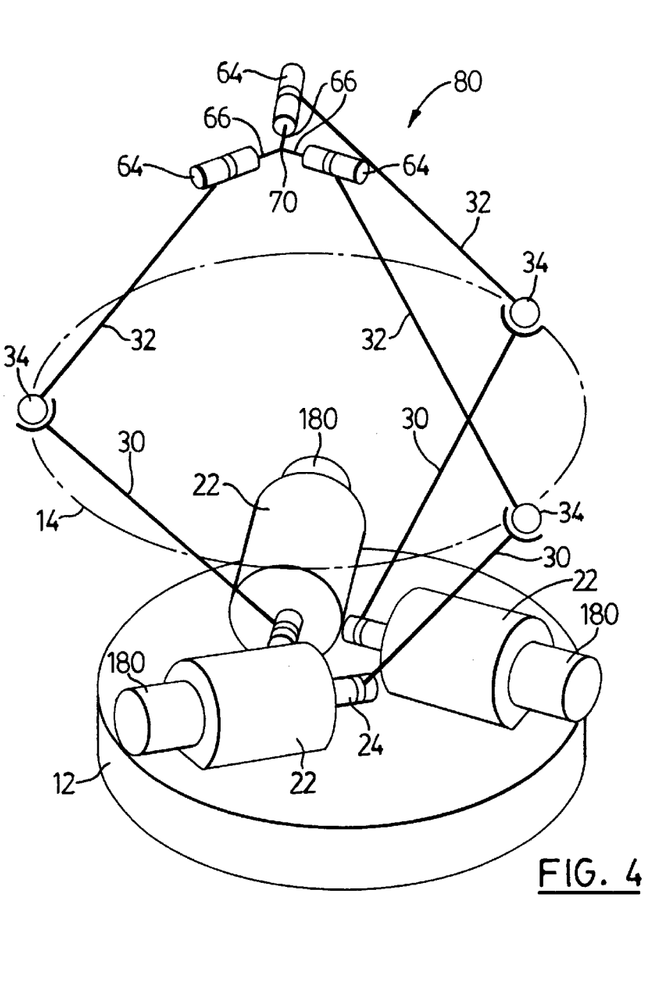
FIG. 4 illustrates a mechanism similar to FIG. 1 with the actuators arranged in a different configuration.

Referring now to FIG. 4, an alternative embodiment of a positioning mechanism is shown at 80 and is essentially identical to mechanism 20 except that actuators 22 are arranged in the triangular configuration which allows for more compact placement of the actuators. The distance between the centres of spherical joints 34 and intersection point 70 is fixed so that the same advantage in simplification of the forward kinematic model related to the intersection of three spheres achieved with device 20 is obtained with mechanism 80. Those skilled in the art will appreciate that the arrangement of actuators in mechanisms 20 and 80 are not the only feasible configurations. The actuators could be arranged in any arbitrary configuration depending on the constraints of the work-space or chosen to provide a different effective workspace for the device depending on the application.

Figure 5:
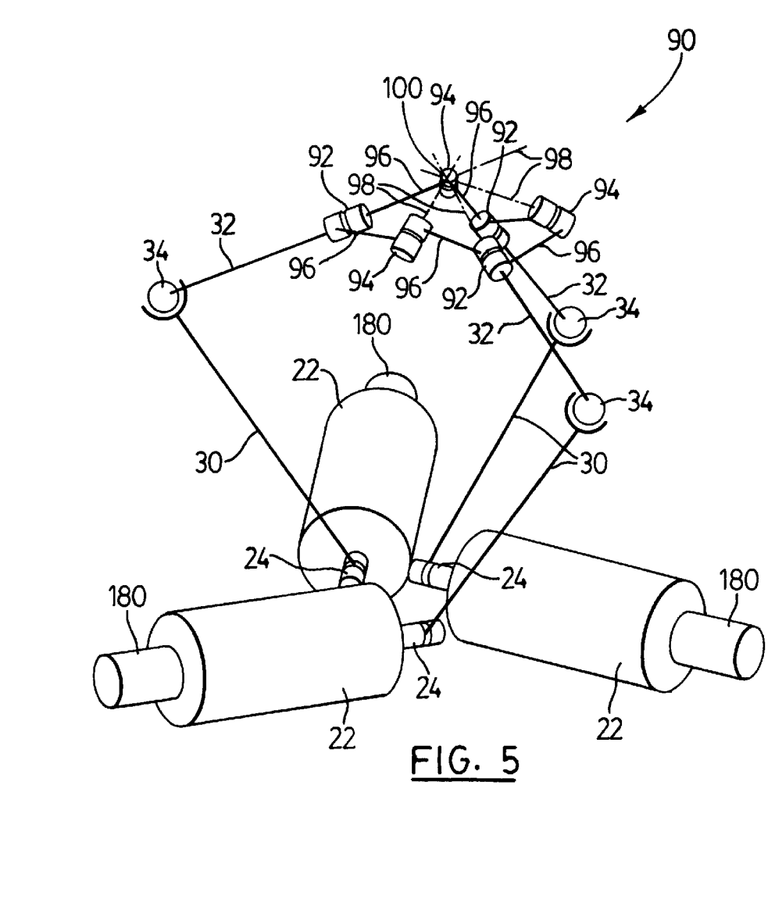
FIG. 5 is an alternative embodiment of the mechanism according to the present invention.
Figure 6:
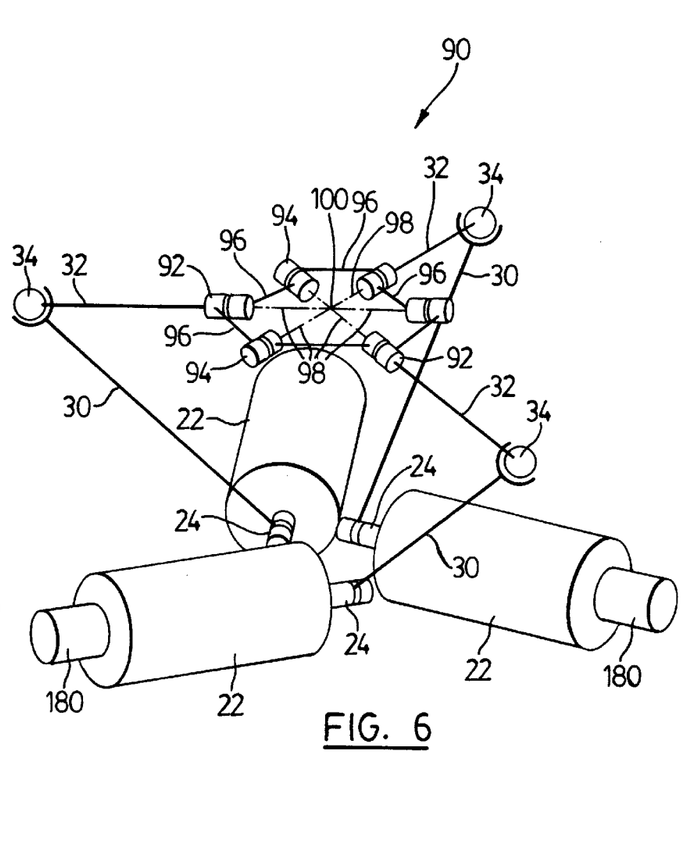
FIG. 6 illustrates the mechanism of FIG. 5 in the stowed configuration.

Referring to FIGS. 5 and 6, another embodiment of a positioning mechanism constructed in accordance with the present invention is shown at 90 and includes a primary stage identical to mechanism 80 in FIG. 4 with actuators 22 in the triangular configuration. The three secondary links are rigidly connected to the ends of revolute joints 92 so that the longitudinal axis of links 32 and joints 92 are parallel or collinear and parallel as illustrated. Located between revolute joints 92 are joints 94 interconnected by links 96. The longitudinal axis 98 of each of the revolute joints 92 and 94 intersect at a common point 100. The distance from intersection point 100 to the centres of spherical joints 34 is constant and the distance corresponds to the length of the virtual or effective secondary link used in the forward kinematic model describing the motion of the end-effector. The embodiment shown in FIG. 6 is one in which the primary links 30 are longer than the distance from the spherical joints to intersection point 100 so that mechanism 90 can be stowed or collapsed to the position shown.

Figure 7:
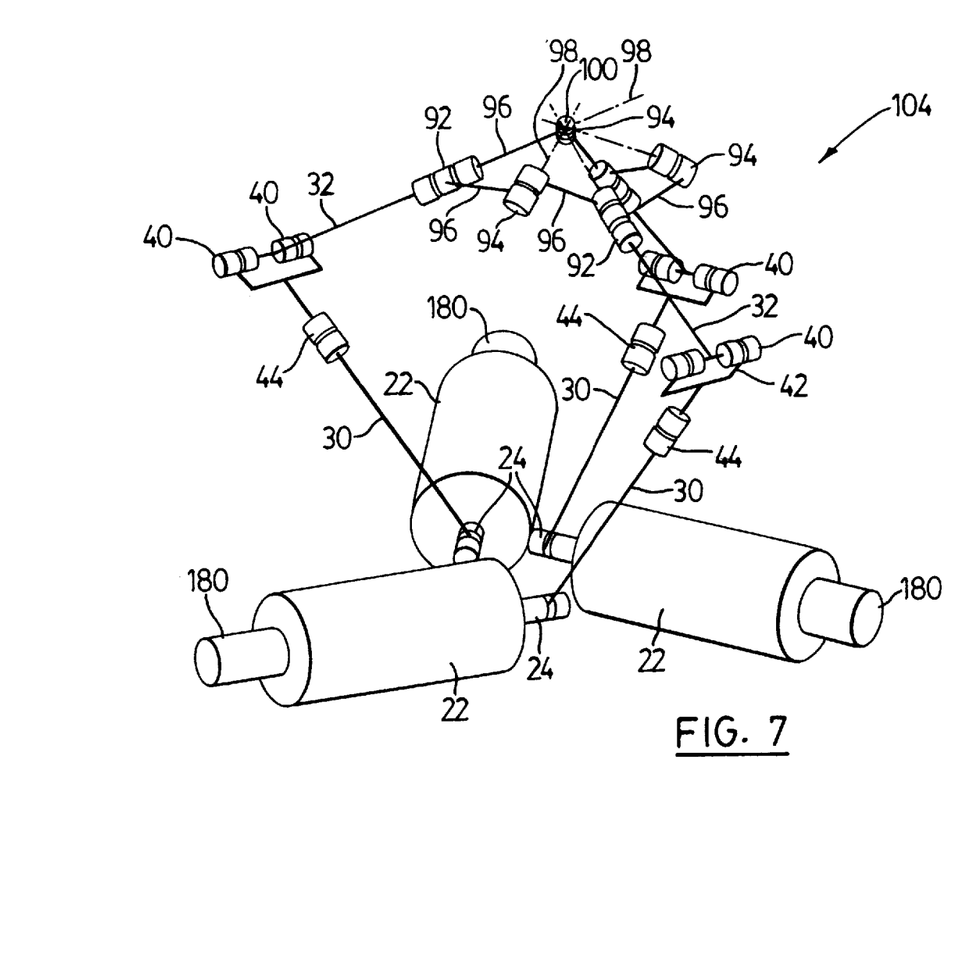
FIG. 7 is a diagrammatic representation of a mechanism similar to the embodiment shown in FIG. 5 using the joint illustrated in FIG. 2.

Mechanism 104 illustrated in FIG. 7 uses joint 38 illustrated in FIG. 2 between links 30 and 32. Joint 46 in FIG. 2 is shown combined with joint 92 in mechanism 104 for the sake of simplicity of design but may be a separate revolute joint.

Figure 8:
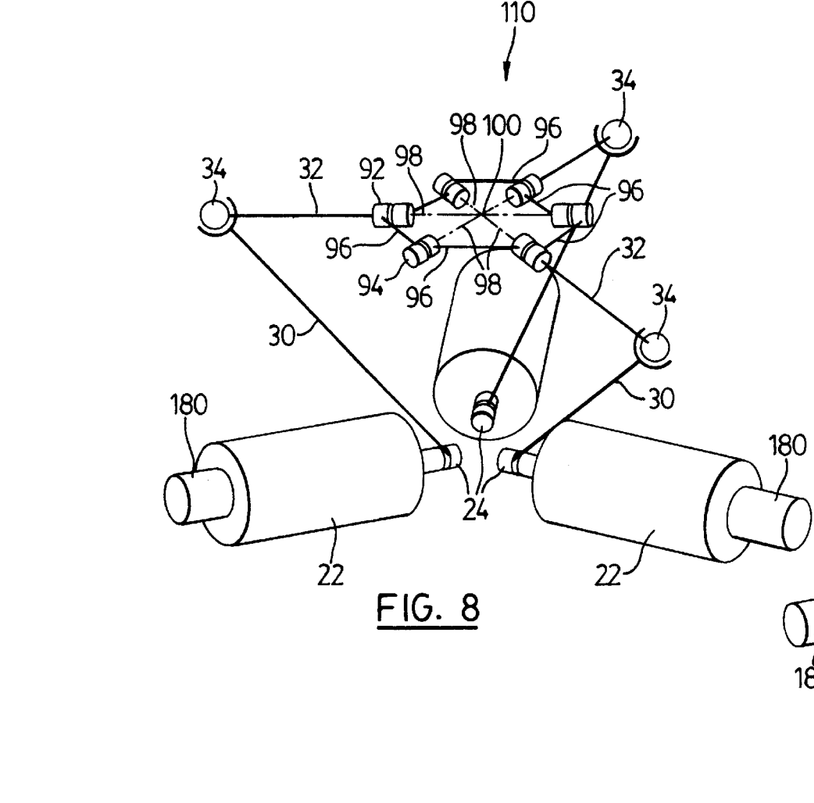
FIG. 8 illustrates a mechanism similar to FIG. 5 with the actuators arranged in a Y configuration.

Shown generally at 110 in FIG. 8 is another embodiment similar to the mechanism of FIG. 5 with the same secondary stage but with actuators 22 in the primary stage being positioned in the Y-shaped configuration.

In some applications improved performance may be obtained by providing more than three branches to give better control and greater force output. This could be achieved for example by modifying mechanism 90 in FIG. 5 to include more than three branches or linkage assemblies. When more than three branches are included, the number of revolute joints 92 will equal the number of secondary links 32 as will the number of revolute joints 94. Each revolute joint 92 is connected to a revolute joint 94 on either side thereof by a link 96. The longitudinal axis of rotation of all revolute joints 92 and 94 intersect at point 100.

The mechanisms for control of position and orientation constructed in accordance with the present invention are advantageous over existing 3 DOF mechanisms for several reasons. The mechanism of the subject invention is characterized by higher rigidity to give higher bandwidth and greater positioning precision than serial mechanisms and many parallel mechanisms. Because the actuators are located on the base and are stationary, the mass and inertia of the mechanism is reduced so that it is capable of supporting heavier payloads and increased velocity of the end-effector. All the above-noted advantages result in for example more ergonomically efficient hand controllers.

Figure 9:
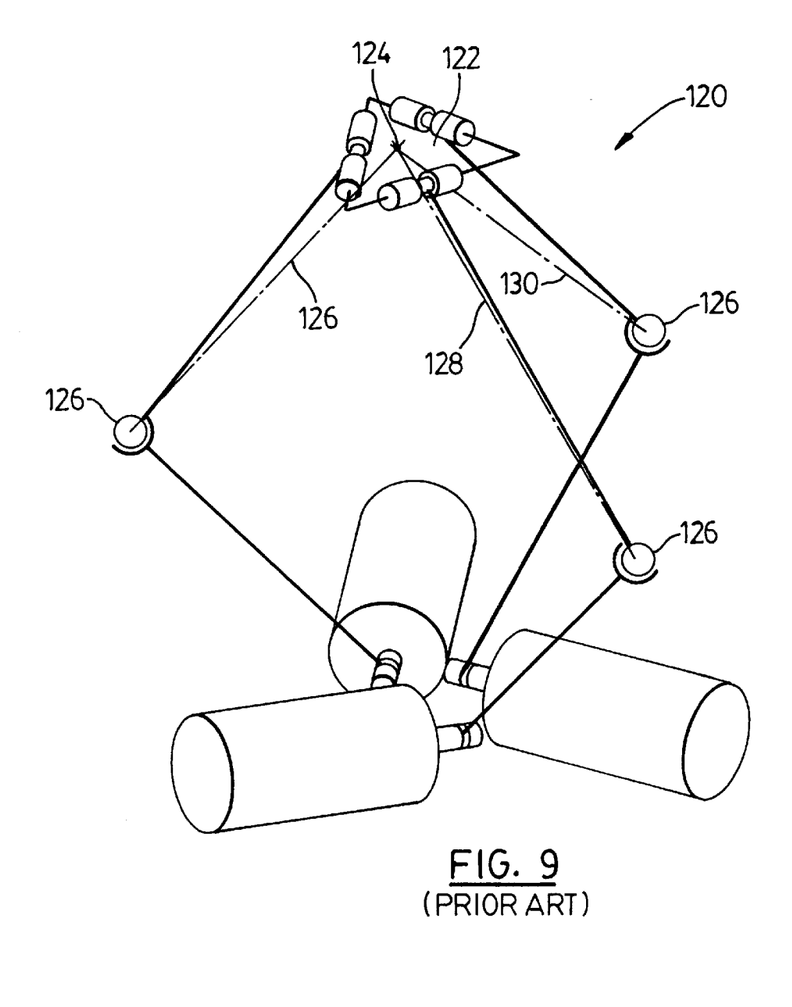
FIG. 9 is a diagrammatic representation of a prior art mechanism for controlling position of a support platform.

In addition, the design of the secondary stage in which the longitudinal axis of all the revolute joints intersect at a point which represents the end-effector is very advantageous. As discussed above, this is because each virtual or effective second link forms the radius of the three spheres centred at each spherical joint whereby the intersection point of the three spheres represents the position of the end-effector. This results in computationally simple forward and inverse kinematic models used to describe the motion compared to known devices. This permits more rapid calculation resulting in improved performance in terms of accuracy and speed of response of position and force control. Referring to FIG. 9, there is shown a diagrammatic representation of a prior art positioning mechanism 120 for controlling the orientation and position of a platform 122. The distances from point 124 in the centre of platform 122 to the centres of joints 126, indicated by the broken lines 130, varies depending on the inclination of the platform. The kinematic model used to describe the position and orientation of this prior art mechanism is much more complex than required for the embodiments of FIGS. 1 to 8.

The mechanisms illustrated in FIGS. 1 to 8 may be used as positioning and/or orientation devices whereby controlling the actuators at the base allows for controlled movement of the end-effectors. Because the orientation of the end-effector, and particularly its inclination, changes with its position, it is possible to control the inclination of the end-effector and its displacement from the base, rather than the three position displacements. The mechanisms are capable of control of three degrees of freedom, either three positions or displacement of the end-effector from a reference point and inclination of the end-effector but not both.

The different embodiments shown herein may be used for both passive and force-reflecting hand controllers. Hand controllers operating in the passive mode are input devices which record the displacement of a user's hand through detection of joint displacement at the base by sensors operably coupled to the joints or actuators. It will be understood by those skilled in the art that for applications as a passive device no actuators 22 are required so that the ends of links 30 would be pivotally attached to a preselected point on a base for example and position sensors would be attached directly to the most convenient position on the branch. The mechanisms may still be used in the passive mode when the actuators 22 are present with sensors 180 coupled to the actuators giving the position of the branch.

Force-reflecting hand controllers can also resist the motion of a user's hand. The force-reflection mode is advantageous in that it makes it possible to prevent a user controlling the device to enter a forbidden region due to operational or mechanical constraints. The force-reflection mode can also be used to guide a user to detect mechanical or geometric properties of virtual objects which do not physically exist in the direct field of view of the user and may for example exist in computer simulations or models graphically displayed on a computer screen.

The position and orienting mechanisms disclosed herein are advantageous in hand controller and force reflection applications for which three degrees of freedom suffice because of the high stiffness, low inertia and low backlash. For applications involving interaction with virtual objects as described above, three degrees of freedom are sufficient provided a handle or finger grip with two or three passive degrees of freedom is provided. The three active degrees of freedom controllable by the actuators can provide a resisting force in any of the three possible orthogonal directions while the passive degrees of freedom at the handle or finger grips permits the user to orient his/her operating hand in an ergonometrically satisfactory way.

Figure 10:
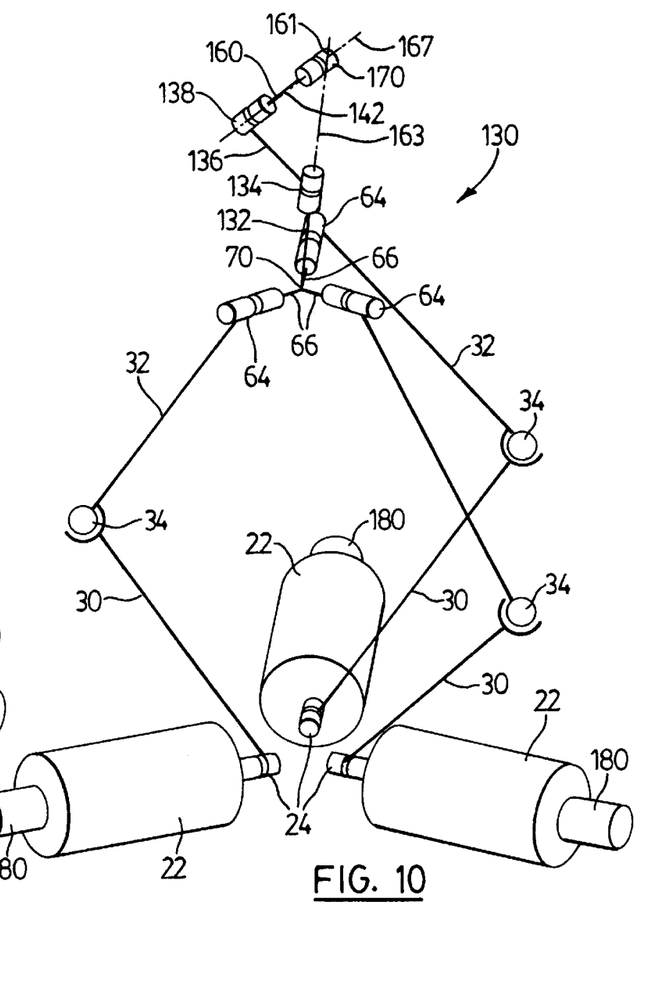
FIG. 10 shows the mechanism of FIG. 1 with a finger grip mounted thereon.
Figure 11:
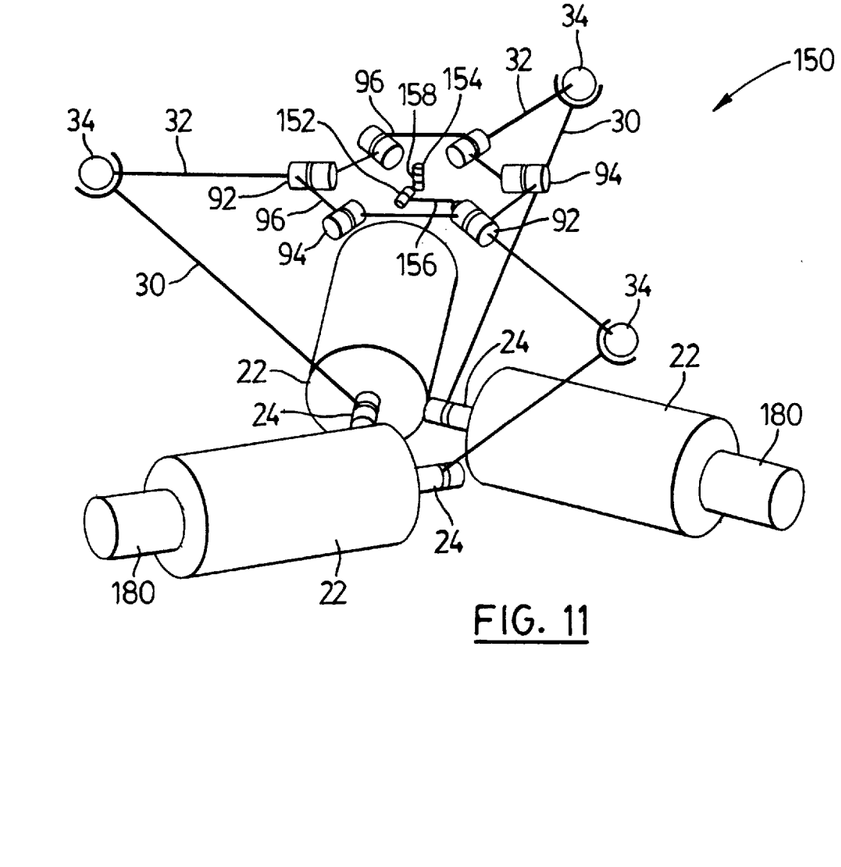
FIG. 11 illustrates the mechanism of FIG. 6 with a finger-grip mounted thereon.
Figure 12:
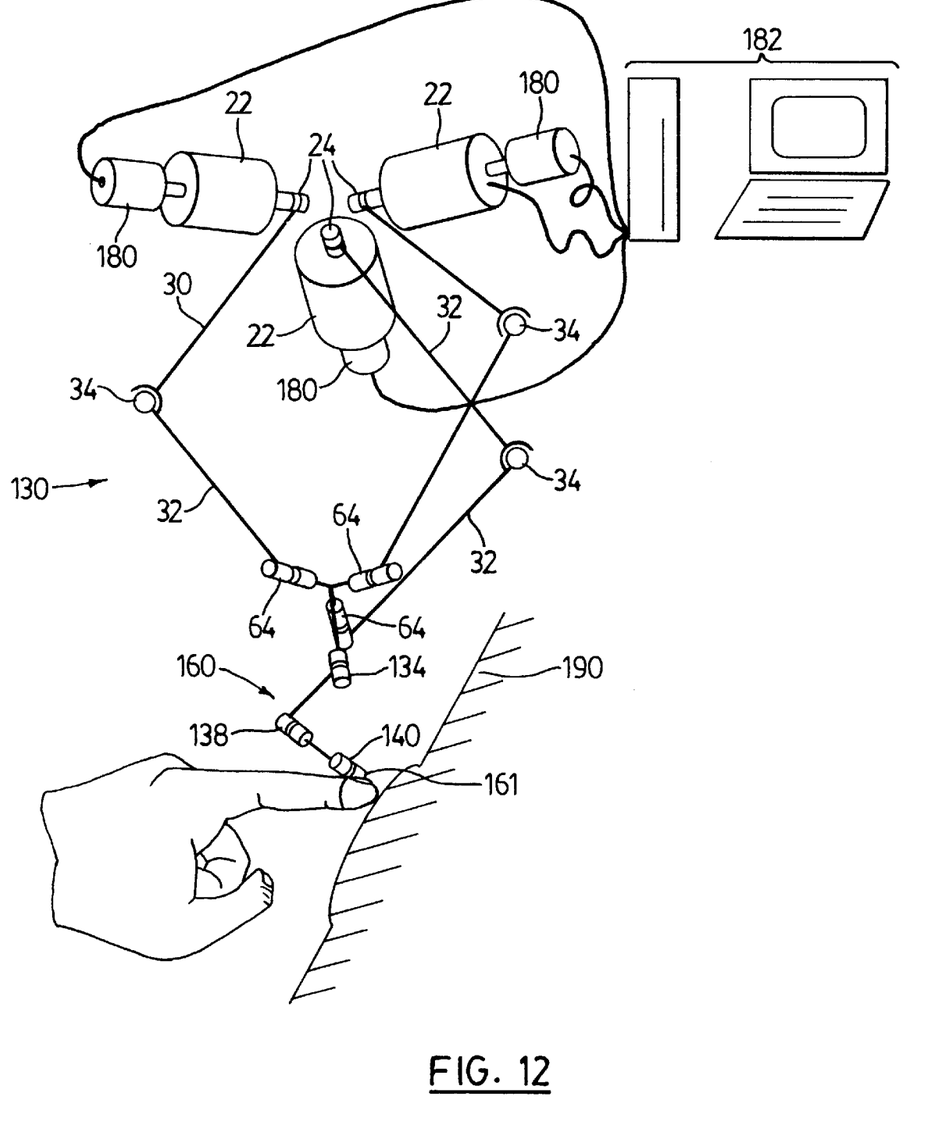
FIG. 12 illustrates a user employing the mechanism of FIG. 10 to interact with a virtual environment.

Referring to FIG. 10, mechanism 130 is the mechanism 20 of FIG. 1 modified to include a handle or finger grip 160 comprising a link 132 connected between intersection point 70 and a revolute joint 134. Revolute joints 138 and 140 are connected in series with joint 134 by links 136 and 142. Similarly, mechanism 150 in FIG. 12 shows the mechanism of FIG. 5 modified to include a finger grip comprising interconnected revolute joints 152 and 154 connected in series by links 156 and 158 to revolute joint 92. The finger grips are attached to the rest of the mechanism so that the end point 161, which is the intersection of longitudinal axis 167 and 163 shown in FIGS. 10 and 12, remains a fixed distance from intersection point 70. Referring specifically to FIG. 10, as joint 138 is rotated about axis 163, end point 161 remains a fixed distance from intersection point 70.

FIG. 12 shows the device of FIG. 10 adapted for use as a hand controller and depicts a user employing the mechanism as a force-reflecting input device integrated with actuators 22, position sensors 180 associated with each actuator and a computer controller 182. Each actuator 22 is coupled to a position sensor 180 which is preferably an optical encoder of the incremental or absolute variety, a resolver, a potentiometer or any other position sensing device commonly used for robotic applications. The position sensors 180 provide feedback of the positions of the actuator shafts 24 which is input to controller 182. Based on this feedback, computer algorithms based on the method of forward kinematics calculates the position of the handle 160, or equivalently, the position of the operating finger. The computer controller 182 superimposes the model of the virtual world onto the work-space of the operating finger and regularly verifies whether the finger is in contact with any of the virtual objects. In the event contact is detected, actuators 22 are commanded to apply a force such that the operating finger experiences the appropriate force arising from its interaction with the virtual object(s).

When a user is interacting with a graphical environment on the computer screen with the aid of the force reflecting mechanism, the user is looking primarily at the computer screen and not the input device. In order to facilitate the user to navigate in the graphical environment using the input device as naturally as possible, the user should feel as little of the structural properties, e.g. friction, weight, inertia, flexibility and backlash, of the device as possible, and should feel primarily the forces arising from interaction with the virtual world. The device of the present invention provides highly transparent and nearly negligible structural properties making it very advantageous for such applications.

While the positioning and orientation mechanism has been described and illustrated with respect to the preferred and alternative embodiments, it will be appreciated that numerous variations of these embodiments may be made without departing from the scope of the invention disclosed herein.

Therefore what is claimed is:

1. A three degree of freedom mechanism for moving and positioning a member in space, comprising:
   a) at least three branches each provided with at least first and second link members, each of said first and second link members of each of said at least three branches being serially connected together by a spherical joint means, each spherical joint means having a center; and
   b) at least three revolute joints each defining an axis of rotation, said at least three revolute joints being connected to associated second link members so that said axes of rotation of said at least three revolute joints intersect at a point of intersection and said revolute joints being interconnected so that said at least three branches define at least three parallel closed loops.

2. The mechanism according to claim 1 wherein said distance from said point of intersection to each spherical joint means remains constant during movement of said at least three branches.

3. The mechanism according to claim 2 wherein said distance from said point of intersection to each spherical joint means is substantially equal.

4. The mechanism according to claim 3 wherein said spherical joint means define a plane of symmetry.

5. The mechanism according to claim 1 including sensor means for measuring the position of each of said at least three branches.

6. The mechanism according to claim 5 including manually engageable means connected to said point of intersection.

7. The mechanism according to claim 1 including stationary actuator means mounted on a base and operably connected for moving said at least three branches.

8. The mechanism according to claim 7 wherein said actuator means includes a separate actuator for each of said at least three branches, said first link member of each of said at least three branches being connected at an end portion thereof to one of said separate actuators.

9. The mechanism according to claim 8 wherein each of said spherical joint means serially connecting said first link member to said second link member is a ball and socket joint.

10. The mechanism according to claim 8 wherein each of said spherical joint means serially connecting said first link member to said second link member comprises three revolute joints connected in series with intersecting but non-parallel axes.

11. The mechanism according to claim 8 wherein each of said separate actuators is a rotary actuator and each of said first and second link members are substantially equal in length, each of said at least three joints being a revolute joint having a third link member extending along said axis of rotation and wherein said third link members are arranged in a mirror image of said connections of said first link members to said rotary actuators.

12. The mechanism according to claim 1 wherein said at least three joints is an even number of revolute joints equal to twice the number of branches with each second link member having an end portion thereof attached to a first number of said revolute joints, and a second number of said revolute joints being located in alternating relationship substantially between said first number of revolute joints and attached thereto by third link members, each revolute joint having an axis of rotation and said axes of rotation intersecting at said point of intersection.

13. The mechanism according to claim 12 including sensor means for measuring the position of each of said at least three branches.

14. The mechanism according to claim 13 including actuator means operably connected for moving each of said at least three branches.

15. The mechanism according to claim 13 wherein each said spherical joint means serially connecting said first link member to said second link member is a ball and socket joint.

16. The mechanism according to claim 13 wherein each of said spherical joint means serially connecting said first link member to said second link member comprises three revolute joints connected in series with intersecting but non-parallel axes.

17. The mechanism according to claim 12 including manually engageable means connected to one of said revolute joints.

18. A three degree of freedom mechanism for moving and positioning a member in space, comprising:
   a) at least three branches each provided with at least first and second link members being serially connected together by a spherical joint;
   b) at least three revolute joints each defining an axis of rotation, said at least three revolute joints being connected to associated second link members so that said axes of rotation of said at least three revolute joints intersect at a point of intersection, wherein the distance from said point of intersection to each spherical joint remains constant during movement of said at least three branches, said revolute joints being interconnected so that said at least three branches define at least three parallel closed loops;

c) said at least three joints being an even number of revolute joints equal to twice the number of branches with each second link member having an end portion thereof attached to a first number of said at least three revolute joints, and a second number of said revolute joints being located in alternating relationship substantially between said first number of revolute joints and attached thereto by third link members, each of said second number of revolute joints having an axis of rotation and said axes of rotation intersecting at said point of intersection; and d) actuator means secured on a base and operably connected for moving each of said at least three branches.

19. The mechanism according to claim 18 wherein said actuator means includes a separate actuator for each of said at least three branches, said first link member of each branch being connected at an end portion thereof to one of said separate actuators.

20. The mechanism according to claim 19 wherein each of said actuators includes sensor means for measuring the position of each of said at least three branches.

21. The mechanism according to claim 20 including a computer connected to said sensor means.

22. The mechanism according to claim 19 including manually engageable means connected to said point of intersection.

23. The mechanism according to claim 19 including manually engageable means connected to one of said revolute joints.

* * * * *